(12) United States Patent
Wang et al.

(10) Patent No.: US 12,474,502 B2
(45) Date of Patent: Nov. 18, 2025

(54) GENERATING SYNTHETIC BOREHOLE IMAGE LOGS

(71) Applicant: Saudi Arabian Oil Company, Dhahran (SA)

(72) Inventors: Weihua Wang, Dhahran (SA); Yunsheng Li, Dhahran (SA); Ibrahim A. Makrami, Dhahran (SA); Maan A. Hawi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 311 days.

(21) Appl. No.: 18/353,528

(22) Filed: Jul. 17, 2023

(65) Prior Publication Data

US 2025/0028071 A1 Jan. 23, 2025

(51) Int. Cl.
*G01V 11/00* (2006.01)
*E21B 7/04* (2006.01)
(Continued)

(52) U.S. Cl.
CPC ............ *G01V 11/002* (2013.01); *E21B 44/00* (2013.01); *E21B 47/0025* (2020.05);
(Continued)

(58) Field of Classification Search
None
See application file for complete search history.

(56) References Cited

U.S. PATENT DOCUMENTS 9,790,787 B2   10/2017   Parker
9,874,551 B2   1/2018    Herron et al.
(Continued)

FOREIGN PATENT DOCUMENTS

CN   204899796   12/2015
CN   105927218   9/2016
(Continued)

OTHER PUBLICATIONS

Baciarelli et al., "Accurate horizontal well placement through evaluation of multiple LWD images with geological modeling," 1st SPWLA India Regional Conference, Mar. 2007, 15 pages.
(Continued)

*Primary Examiner* — Henok Shiferaw
(74) *Attorney, Agent, or Firm* — Fish & Richardson P.C.

(57) ABSTRACT

Systems and methods for generating synthetic borehole image logs include logging rate of penetration (ROP) data, resistivity data, and gamma ray data while drilling a borehole in a subsurface formation to generate logged data. The generating includes determining an effective dip angle of the subsurface formation along the borehole and generating a depth shift table based on the effective dip angle and a well deviation angle, the well deviation angle being between the borehole and a vertical reference. Datasets are generated based on the ROP data, resistivity data, and gamma ray data, the generated datasets having higher sampling rates than the logged data. Synthetic borehole images are generated based on the generated datasets and the depth shift table, and the synthetic borehole images are oriented with respect to a reference point of the borehole.

17 Claims, 14 Drawing Sheets

(51) Int. Cl.
*E21B 44/00* (2006.01)
*E21B 47/002* (2012.01)
*E21B 47/026* (2006.01)
*E21B 49/00* (2006.01)

(52) U.S. Cl.
CPC ............ *E21B 47/026* (2013.01); *E21B 49/00* (2013.01); *E21B 7/04* (2013.01)

(56) References Cited

U.S. PATENT DOCUMENTS

| | | | |
|---|---|---|---|
| 10,445,669 B2 * | 10/2019 | Wessling | G06Q 10/0631 |
| 2009/0289628 A1 | 11/2009 | Cao Minh | |
| 2011/0295510 A1 * | 12/2011 | Gulati | G01V 1/288 |
| | | | 345/419 |
| 2012/0179444 A1 * | 7/2012 | Ganguly | E21B 49/00 |
| | | | 703/10 |
| 2016/0266274 A1 | 9/2016 | Alqam et al. | |
| 2017/0260855 A1 | 9/2017 | Yang et al. | |
| 2018/0003653 A1 | 1/2018 | Tinni et al. | |
| 2018/0031732 A1 | 2/2018 | Mosse et al. | |
| 2019/0025461 A1 | 1/2019 | Wiener et al. | |
| 2019/0055842 A1 | 2/2019 | Lu | |
| 2022/0106866 A1 | 4/2022 | Wang et al. | |
| 2023/0324580 A1 | 10/2023 | Wang et al. | |

FOREIGN PATENT DOCUMENTS

| | | |
|---|---|---|
| CN | 109753302 | 5/2019 |
| WO | WO 2016032489 | 3/2016 |
| WO | WO 2020149824 | 7/2020 |

OTHER PUBLICATIONS

Cui et al., "Prediction of diagenetic facies using well logs—a case study from the upper Triassic Yanchang Formation, Ordos Basin, China," Marine and Petroleum Geology, Mar. 2017, 81:50-65, 16 pages.
De Segonzac, "The birth and development of the concept of diagenesis," Earth Science Reviews, 1968, 4:153-201, 49 pages.
Desbois et al., "High-resolution 3D fabric and porosity model in a tight gas sandstone reservoir: a new approach to investigate microstructures from mm-to nm-scale combing argon beam cross sectioning and SEM imaging," Journal of Petroleum Science and Engineering, Aug. 2011, 78(2):243-257, 15 pages.
Greiss et al., "Real-time density and gamma ray images acquired while drilling help to position horizontal wells in a structurally complex north sea field," SPWLA 44th Annual Logging Symposium, Jun. 2003, 11 pages.
Higgs et al., "Diagenesis, porosity evolution, and petroleum emplacement in tight gas reservoirs, Taranaki Basin, New Zealand," Journal Sedimentary Research, Dec. 1, 2007, 77(12):1003-1025, 23 pages.
Lai et al., "Fractal analysis of tight shaly sandstones using nuclear magnetic resonance measurements," AAPG Bulletin, Feb. 2018, 102(2):175-193, 5 pages.
Liu et al., "Diagenetic facies controls on pore structure and rock electrical parameters in tight gas sandstone," Journal Geophysical Engineering, 2015, 12(4):587-600, 14 pages.
Monsees, "Rock typing of diagenetically induced heterogeneities—A case study from a deeply-buried clastic Rotliegend reservoir of the Northern German Basin," Marine and Petroleum Geology, Mar. 2020, 113(104163):1-14, 14 pages.
Naides, "Petrophysical Analysis Method To Identify "Sweet Spots" in Tight Gas Reservoirs: Case Study From Punta Rosada Formation in Neuquen Basin, Argentina," Prepared for presentation at the SPE Latin American & Caribbean Petroleum Engineering Conference held in Lima, Peru, Dec. 1-3, 2010, 17 pages.
Schmid et al., "Diagenesis and reservoir quality of the Sherwood Sandstone (Triassic), Corrib Field, Slyne Basin, West of Ireland," Marine and Petroleum Geology, 2004, 21:299-315, 17 pages.

* cited by examiner

GENERATING SYNTHETIC BOREHOLE IMAGE LOGS

TECHNICAL FIELD

The present disclosure relates to characterizing subsurface formations and well placement.

BACKGROUND

One or more types of borehole images (e.g., gamma ray, resistivity, and density images) can be acquired simultaneously while drilling a well providing real-time images for geological interpretation and formation dip calculations to assist well placement even in slimholes (e.g., boreholes diameter as small as 5.875 inches). Real-time density and gamma ray images are often used for geo-steering which can be used with geological modeling for better horizontal well placement.

SUMMARY

Under balanced coil tubing drilling (UBCTD) is a method for drilling wells with extra slimholes (e.g., boreholes with a diameter less than 4 inches, or typically 3⅝ inches). Near-bit gamma ray and resistivity logs can be acquired. However, due to the small diameter of the borehole, conventional image logging tools cannot be used to acquire borehole images. Well placement for UBCTD wells is largely based on biomarkers through cutting analysis and limited log responses.

This disclosure describes systems and methods for generating synthetic borehole images based on available LWD data. For example, a data processing system (e.g., control system, computer system) generates at-bit rate of penetration (ROP) synthetic images, near-bit resistivity synthetic images, and/or near-bit gamma ray synthetic images based on structure information of the subsurface formation, drilling data, and logging data. The data processing system determines an effective formation dip along the planned and/or drilled well path. The data processing system generates a depth shift table for each bin image based on the relations of effective structure dip and the well deviation. The data processing system can generate high-resolution borehole images (e.g., samples at least every 0.1 inch) based on different properties (e.g., resistivity, gamma ray, ROP) along the well path. The data processing system orients the generated borehole images with respect to a reference point of the borehole (e.g., the top of the borehole for horizontal wells or a specified azimuthal location of the borehole).

In one aspect, a method for generating synthetic borehole image logs includes logging rate of penetration (ROP) data, resistivity data, and gamma ray data while drilling a borehole in a subsurface formation to generate logged data; determining an effective dip angle of the subsurface formation along the borehole; generating a depth shift table based on the effective dip angle and a well deviation angle, the well deviation angle being between the borehole and a vertical reference; generating datasets based on the ROP data, resistivity data, and gamma ray data, the generated datasets having higher sampling rates than the logged data; generating synthetic borehole images based on the generated datasets and the depth shift table; orienting the synthetic borehole images with respect to a reference point of the borehole.

In one aspect, a system for generating borehole image logs includes at least one processor; and a memory storing instructions that, when executed by the at least one processor, cause the at least one processor to perform operations including logging rate of penetration (ROP) data, resistivity data, and gamma ray data while drilling a borehole in a subsurface formation to generate logged data; determining an effective dip angle of the subsurface formation along the borehole; generating a depth shift table based on the effective dip angle and a well deviation angle, the well deviation angle being between the borehole and a vertical reference; generating datasets based on the ROP data, resistivity data, and gamma ray data, the generated datasets having higher sampling rates than the logged data; generating synthetic borehole images based on the generated datasets and the depth shift table; orienting the synthetic borehole images with respect to a reference point of the borehole.

In one aspect, one or more non-transitory machine-readable storage devices storing instructions for generating synthetic borehole image logs, the instructions being executable by one or more processors, to cause performance of operations including logging rate of penetration (ROP) data, resistivity data, and gamma ray data while drilling a borehole in a subsurface formation to generate logged data; determining an effective dip angle of the subsurface formation along the borehole; generating a depth shift table based on the effective dip angle and a well deviation angle, the well deviation angle being between the borehole and a vertical reference; generating datasets based on the ROP data, resistivity data, and gamma ray data, the generated datasets having higher sampling rates than the logged data; generating synthetic borehole images based on the generated datasets and the depth shift table; orienting the synthetic borehole images with respect to a reference point of the borehole.

Implementations of these aspects can include one or more of the following features.

In some implementations, these aspects include drilling a well along a well path based on a formation cutting direction identified in the oriented synthetic borehole images.

In some implementations, these aspects include generating a visual representation of the borehole based on at least one of the ROP data, resistivity data, gamma ray data, and synthetic borehole images.

In some implementations, generating the synthetic borehole images includes generating one or more of synthetic at bit ROP borehole images, synthetic near bit gamma ray borehole images, and synthetic near bit resistivity borehole images.

In some implementations, determining effective dip of the formation includes measuring a dip of the formation along the well path based on a structure map of the subsurface formation.

In some implementations, determining an effective dip of the subsurface formation includes determining a vertical distance between a first true depth location of a surface in the borehole and a second true depth location of the surface in a mother bore associated with the borehole; determining a horizontal distance between the first and second true depth locations; and determining the effective dip angle based on the vertical distance and the horizontal distance.

In some implementations, generating the synthetic borehole images includes generating a plurality of bin sector images, each bin sector image having a fixed coefficient of measured depth difference. In some cases, the fixed coefficient of measured depth difference is based on a sinusoid and an azimuthal location of the bin sector image.

In some implementations, the generated datasets have a sampling rate of at least one sample per 0.1 inch.

Implementations of the systems and methods of this disclosure can provide various technical benefits. The synthetic borehole images can be used in well placement for UBCTD wells for sidetracking existing vertical wells and drilling new horizontal laterals. The synthetic borehole images provide additional insight into the subsurface formation and provide a visual representation that can be used to reduce time for critical well placement decision making. For example, a "sad face" representation in the synthetic borehole images indicates the drill bit is cutting down the formation (e.g., the well deviation is less than 90 degrees plus the effective dip). A "happy face" representation in the synthetic borehole images indicates the drill bit is cutting up the formation (e.g., the well deviation is greater than 90 degrees plus the effective dip). The synthetic borehole images can be generated for extra slimholes and larger diameter boreholes without adding additional equipment costs. The synthetic borehole images can be a predictive tool for better well placement.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for generating synthetic borehole images based on geological data, LWD data, and drilling data. For example, a data processing system (e.g., control system, computer system) generates at-bit rate of penetration (ROP) synthetic images, near-bit resistivity synthetic images, and/or near-bit gamma ray synthetic images based on structure information of the subsurface formation, drilling data, and logging data. The data processing system determines an effective formation dip along the planned and/or drilled well path. The data processing system generates a depth shift table for each bin image based on the relations of effective structure dip and the well deviation. The data processing system can generate high-resolution borehole images (e.g., samples at least every 0.1 inch) based on different properties (e.g., resistivity, gamma ray, ROP) along the well path. The data processing system orients the generated borehole images with respect to a reference point of the borehole (e.g., the top of the borehole for horizontal wells or a specified azimuthal location of the borehole).

Figure 1:
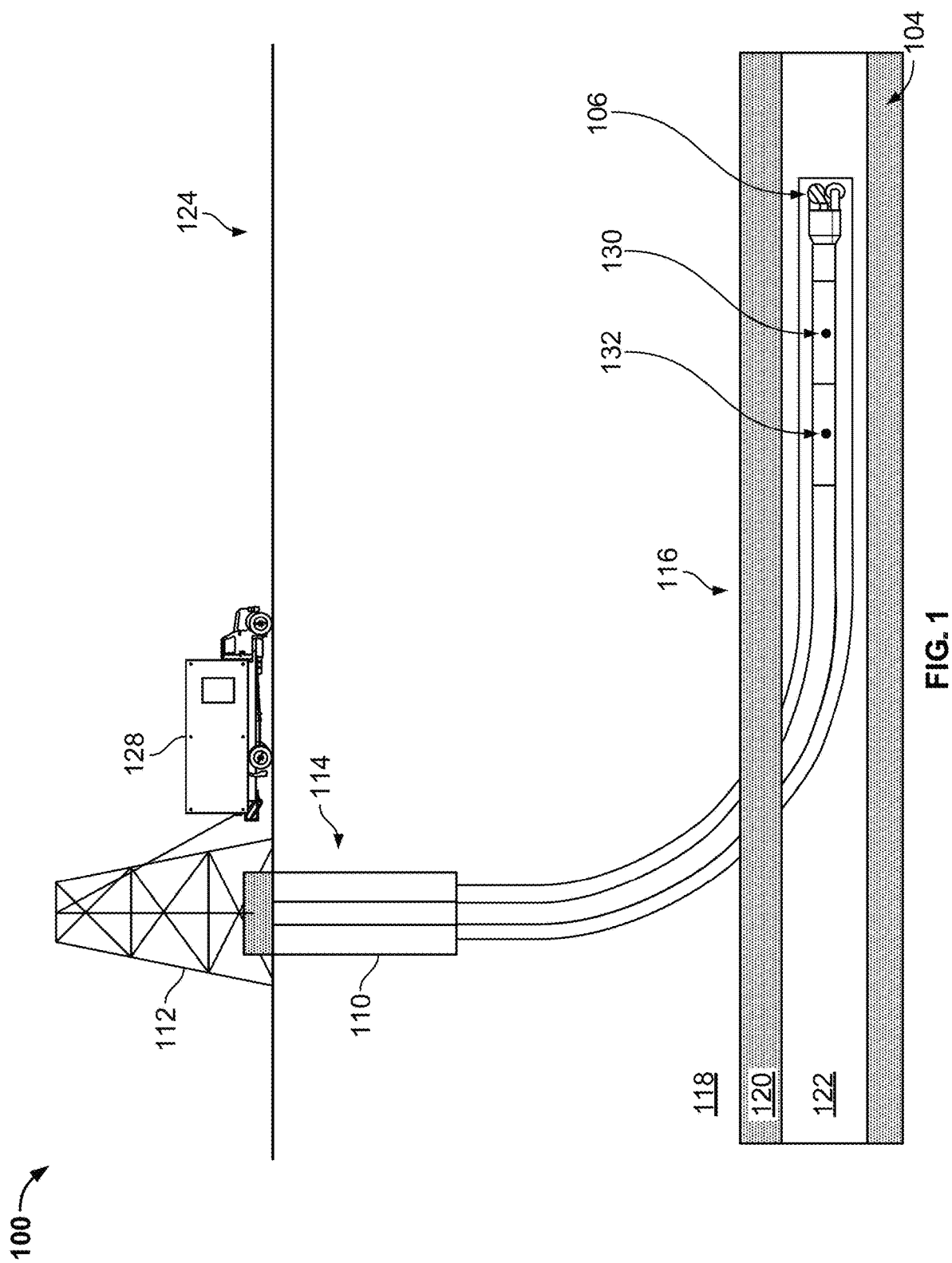
FIG. 1 is a schematic diagram of an LWD operation for UBCTD wells.

FIG. 1 is a schematic diagram illustrating an LWD operation 100 in which a wellbore 110 extends downhole from a wellhead 112. Wellbore 110 includes a vertical portion 114 and a horizontal portion 116. The wellbore 110 can be a slimhole or an extra slimhole drilled with UBCTD. LWD operations can be performed in other wellbores, for example, slanted wellbores. In the LWD operation 100, the wellbore 110 penetrates through three layers 118, 120, and 122 of a subsurface formation 124.

The bottom hole assembly (BHA) 104 includes the drill bit 106 and a string of one or more instruments with sensors operable to measure petrophysical properties of the subsurface formation 124. For example, a resistivity logging tool 130 measures the subsurface electrical resistivity, which is the ability to impede the flow of electric current around the wellbore. A gamma ray logging tool 132 measures naturally occurring gamma radiation to characterize rock or sediment around the borehole. Resistivity logs can help a data processing system differentiate between formations filled with salty waters (good conductors of electricity) and those filled with hydrocarbons (poor conductors of electricity). Other types of logs can also be included in larger diameter wellbores. Porosity logs measure the fraction or percentage of pore volume in a volume of rock using acoustic or nuclear technology. Acoustic logs measure characteristics of sound waves propagated through the well-bore environment. Nuclear logs utilize nuclear reactions that take place in the downhole logging instrument or in the formation. Density logs measure the bulk density of a formation by bombarding it with a radioactive source and measuring the resulting gamma ray count after the effects of Compton scattering and photoelectric absorption. Sonic logs provide a formation interval transit time, which typically is a function of lithology and rock texture but particularly porosity. The logging tool includes a piezoelectric transmitter and receiver and the time taken for the sound wave to travel the fixed distance between the two is recorded as an interval transit time.

As the BHA 104 travels downhole, the sensors of the BHA measure formation properties to generate a well log that is recorded at the control truck 128. In the illustrated operation, the data are recorded at the control truck 128 in real-time. Real-time data are recorded directly against measured drilled depth. The real-time data can be recorded by a data processing system within the control truck 128. The data processing system can process the recorded real-time data for use while drilling the wellbore. Alternatively, or additionally, the data processing system can upload the data to a network or cloud server to be processed by a separate computer or data processing system.

Figure 2:
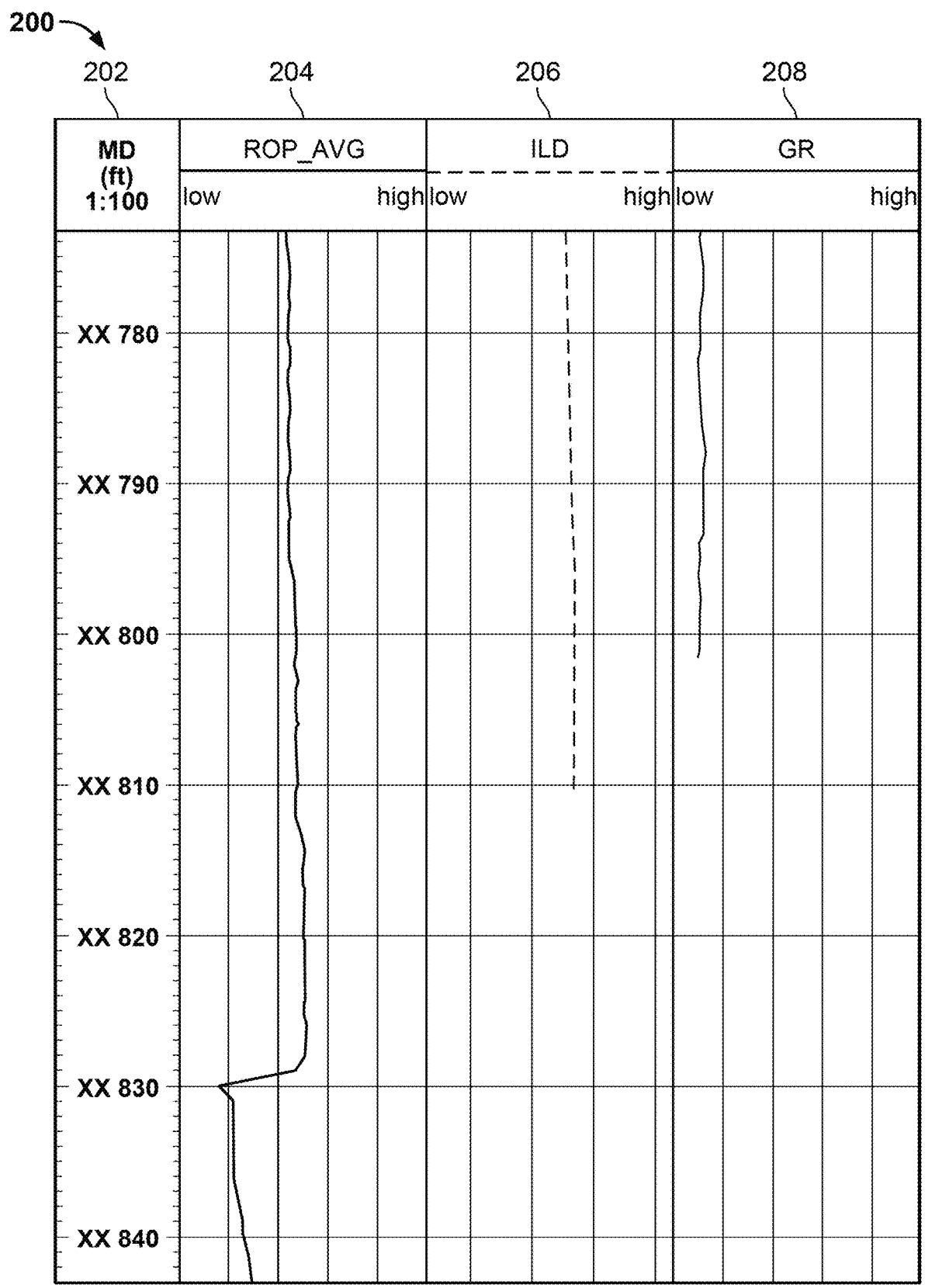
FIG. 2 illustrates plots of properties measured during a UBCTD LWD operation.

FIG. 2 is an example plot 200 of measurements from an LWD UBCTD operation (e.g., LWD operation 100). The first track 202 shows the measured depth of the wellbore. The second track is the average rate of penetration (ROP) log 204. The third track is a near-bit resistivity log 206. The fourth track is a near-bit gamma ray log 208. The resistivity log 206 and gamma ray log 208 have a shallower depth than the ROP log 204 due to the distances of the resistivity sensor and gamma ray sensor from the drill bit in the BHA.

Figure 3:
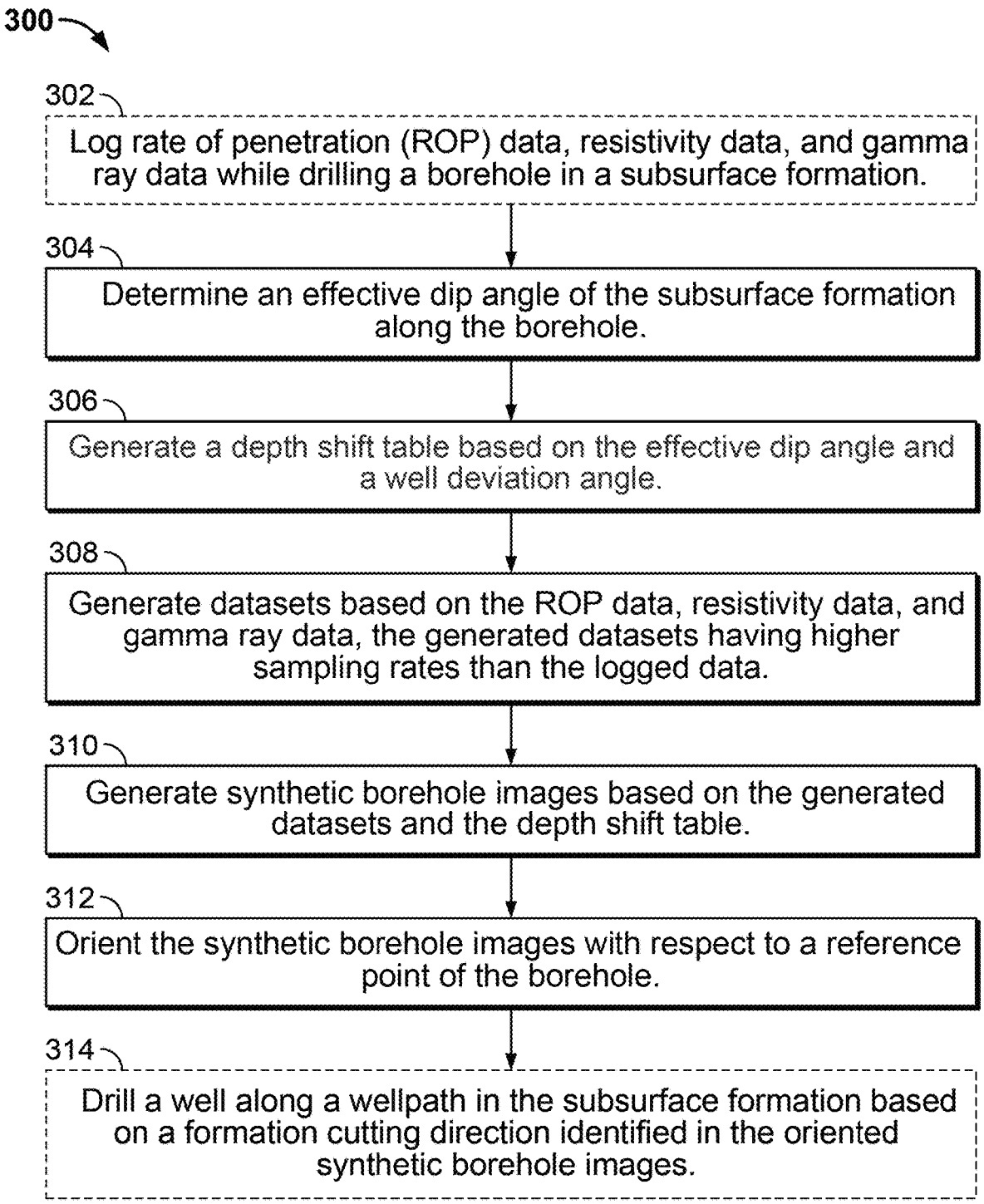
FIG. 3 is a flow chart of a method for generating synthetic borehole image logs.

FIG. 3 is a flow chart for a method 300 of generating synthetic borehole images based on LWD data. The method 300 can be applied in wells that acquire LWD data. In particular, the method 300 is useful for wells being drilled without borehole imaging logging tools. For example, the method 300 can be used while drilling extra slimholes using UBCTD methods for which no borehole image logging tools are available.

A data processing system, such as a control system or computer system, logs ROP data, resistivity data, and gamma ray data while drilling a borehole in a subsurface formation (step 302). The data processing system can store and process the logged data locally. Alternatively, or additionally, the data processing system transmits the data to a different data processing system for further processing.

The data processing system can log the data in real-time. Real-time or near real-time processing refers to a scenario in which received data (e.g., well log data) are processed as made available to systems and devices requesting those data immediately (e.g., within milliseconds, tens of milliseconds, or hundreds of milliseconds) after the processing of those data are completed, without introducing data persistence or store-then-forward actions. In this context, a real-time data processing system is configured to process well log data as quickly as possible (though processing latency may occur). Though data can be buffered between module interfaces in a pipelined architecture, each individual module operates on the most recent data available to it. The overall result is a workflow that, in a real-time context, receives a data stream (e.g., well log data) and outputs processed data based on that data stream in a first-in, first out manner. However, non-real-time contexts are also possible, in which data are stored (either in memory or persistently) for processing at a later time. In this context, modules of the data processing system do not necessarily operate on the most recent data available.

The data processing system determines an effective dip angle (EDIP) of the subsurface formation along the path of the borehole (step 304). The EDIP can be, for example, the formation dip along the direction of the well path. In some implementations, the data processing system can determine the EDIP from a structure map of the subsurface formation. In some implementations, the effective dip angle is determined based on a correlation between a vertical mother bore and a sidetrack lateral.

Figure 4:
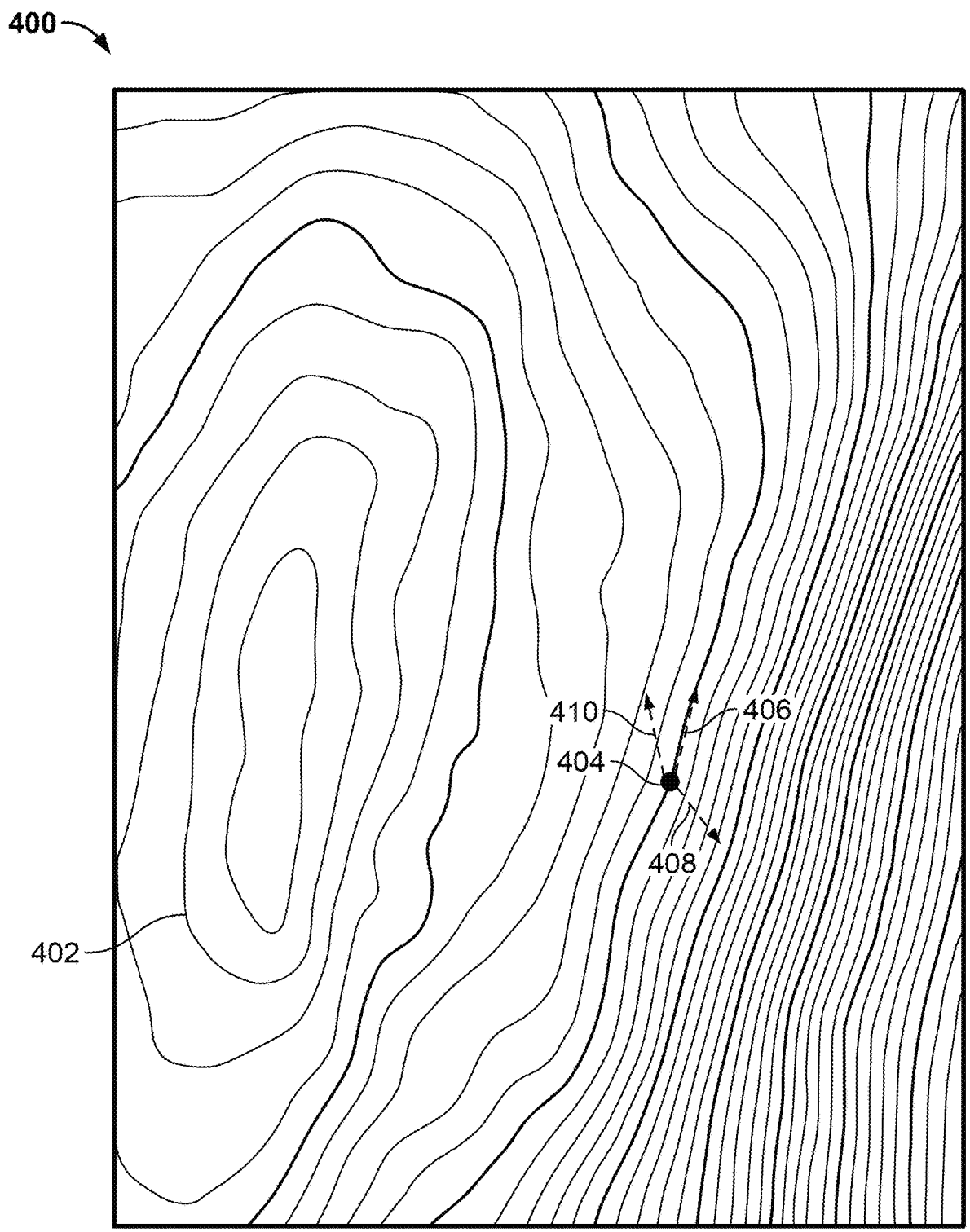
FIG. 4 is a structure contour map of a subsurface formation showing structure variation across the field for the target formation.

FIG. 4 is an example structure map 400 of a subsurface formation. The data processing system can determine the initial effective dip from the structure map. The EDIP can be determined based on the slope in the structure map 400. For example, the slope can be determined from the change in vertical elevation indicated by the contours 402 based on horizontal displacement from a starting wellbore 404. In particular, there are three scenarios that can be considered: along the strike 406, down dip 408, and up dip 410. Along the strike 406 the EDIP will be 0 degrees since there is no change in the elevation of the structure map. Down-dip 408 EDIP will be a positive angle. Up dip 410, the EDIP will be a negative angle.

Figure 5:
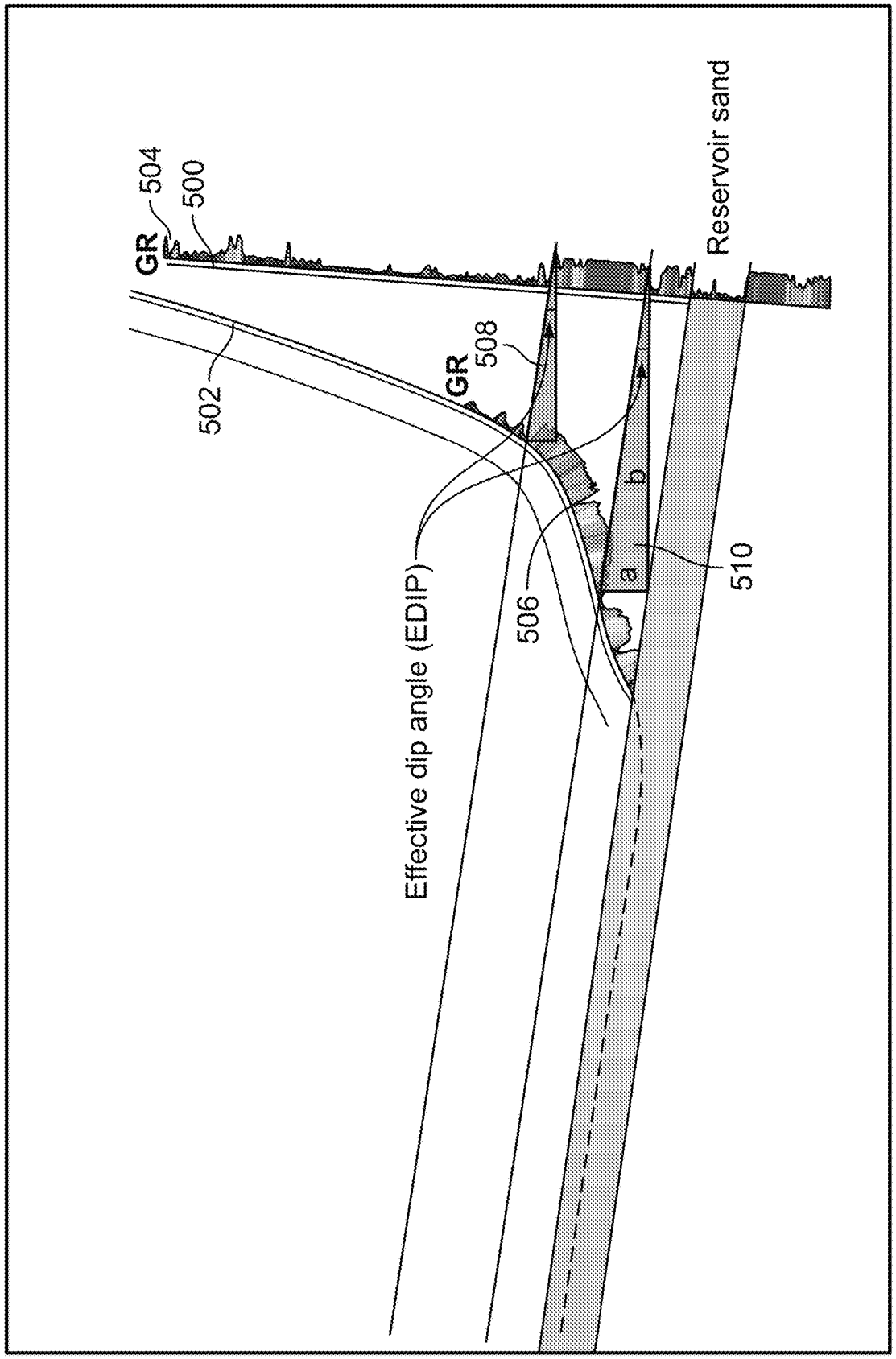
FIG. 5 schematically illustrates effective dip angles.
Figure 6A:
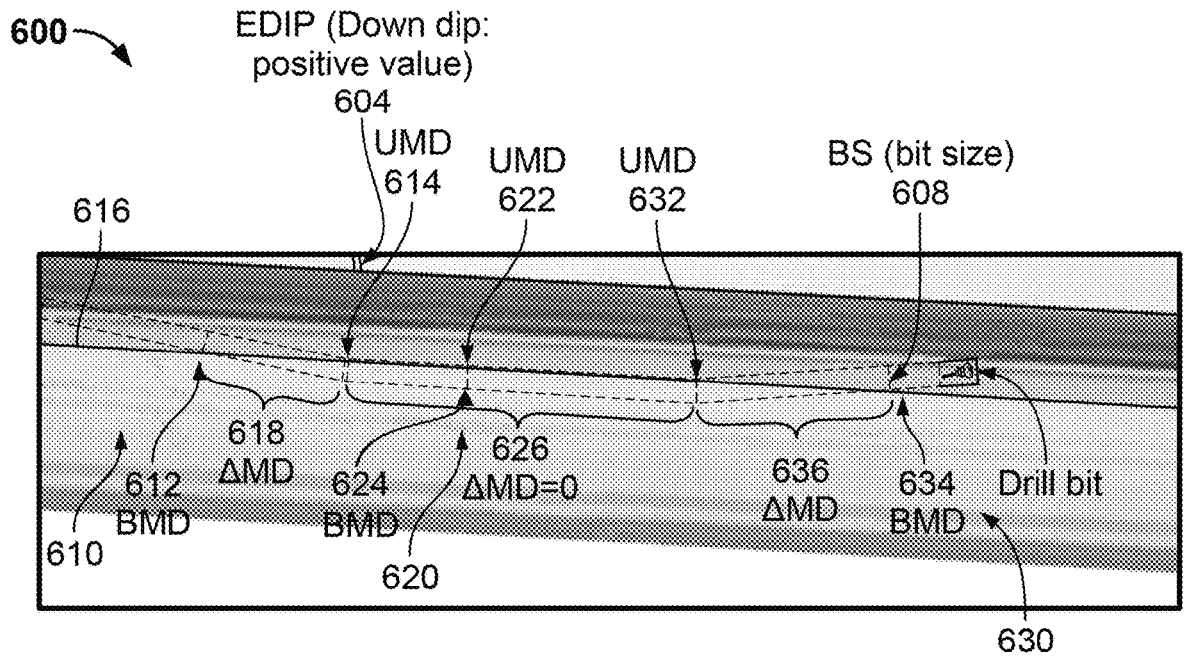
FIGS. 6A-6B schematically illustrate a borehole being drilled down dip and up dip.
Figure 6B:
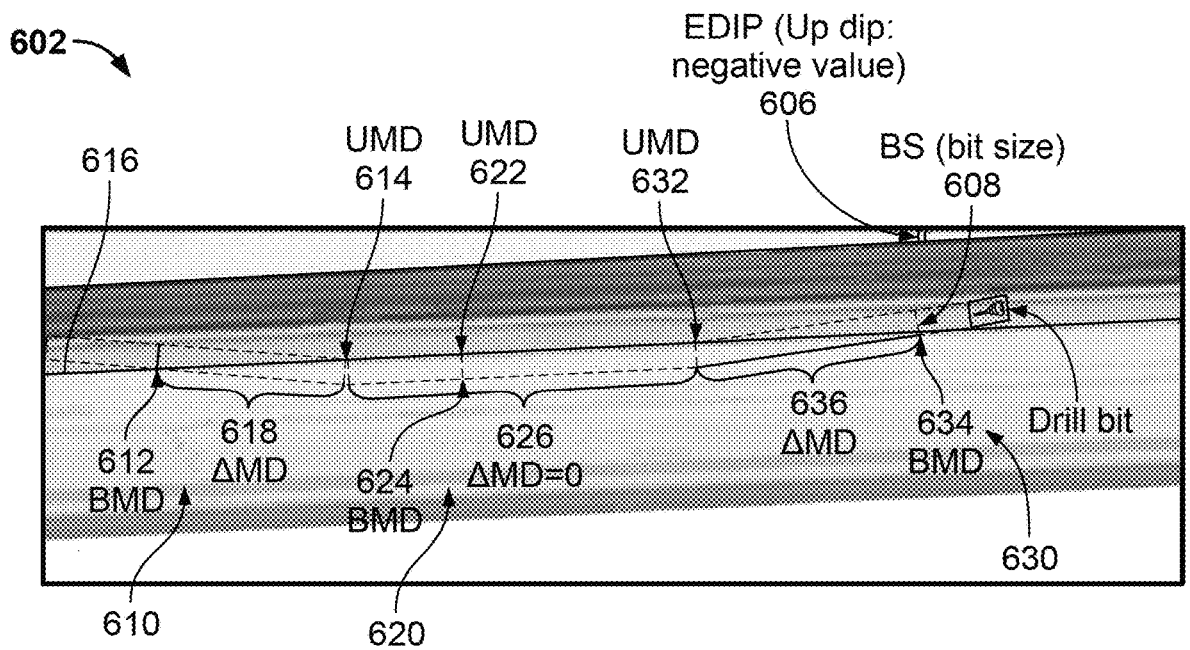
Figure 7A:
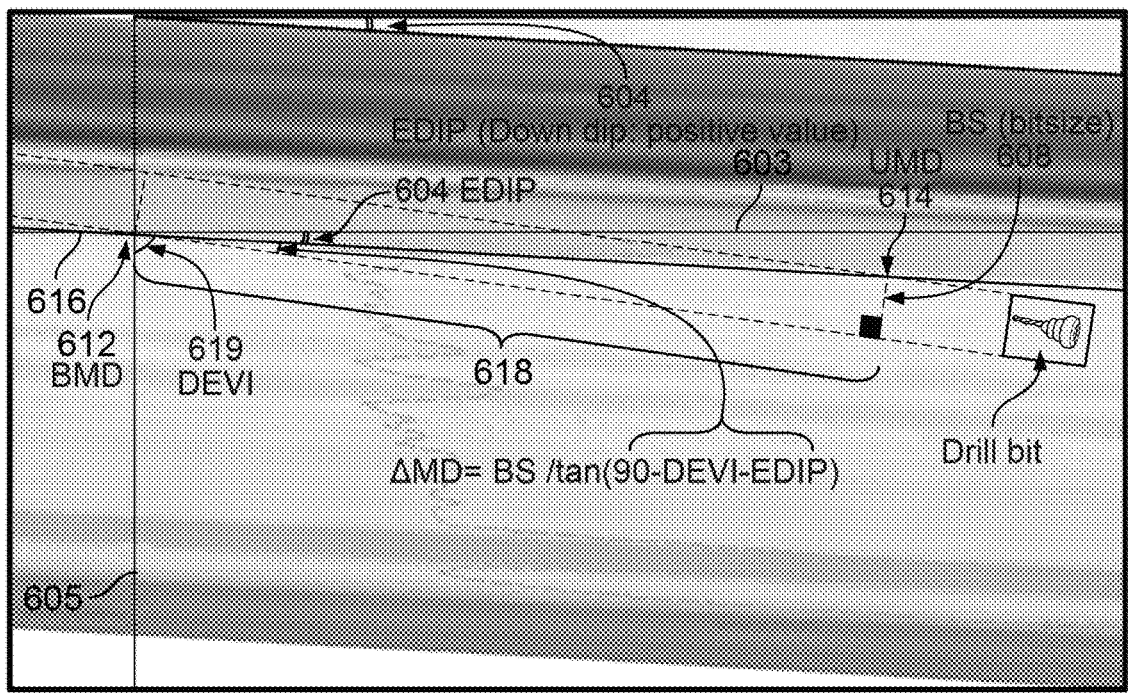
FIGS. 7A-7B are schematic diagrams showing drilling down in an up dip scenario and a down dip scenario.
Figure 7B:
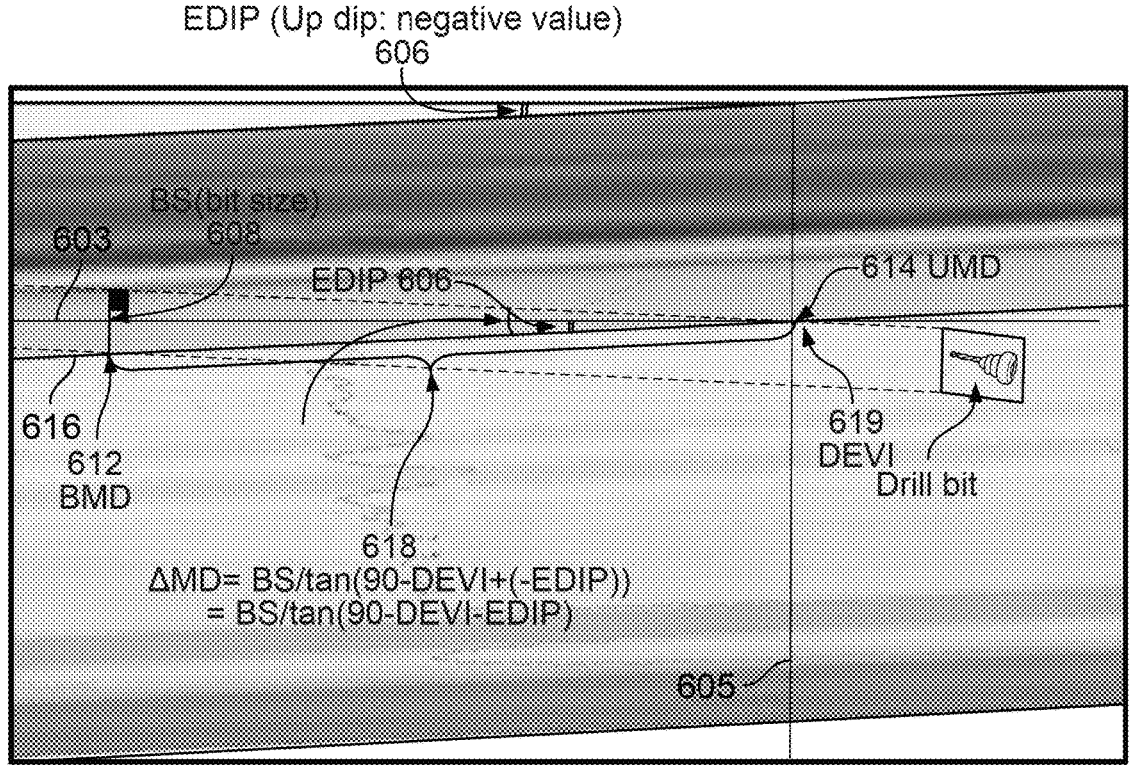
Figure 8A:
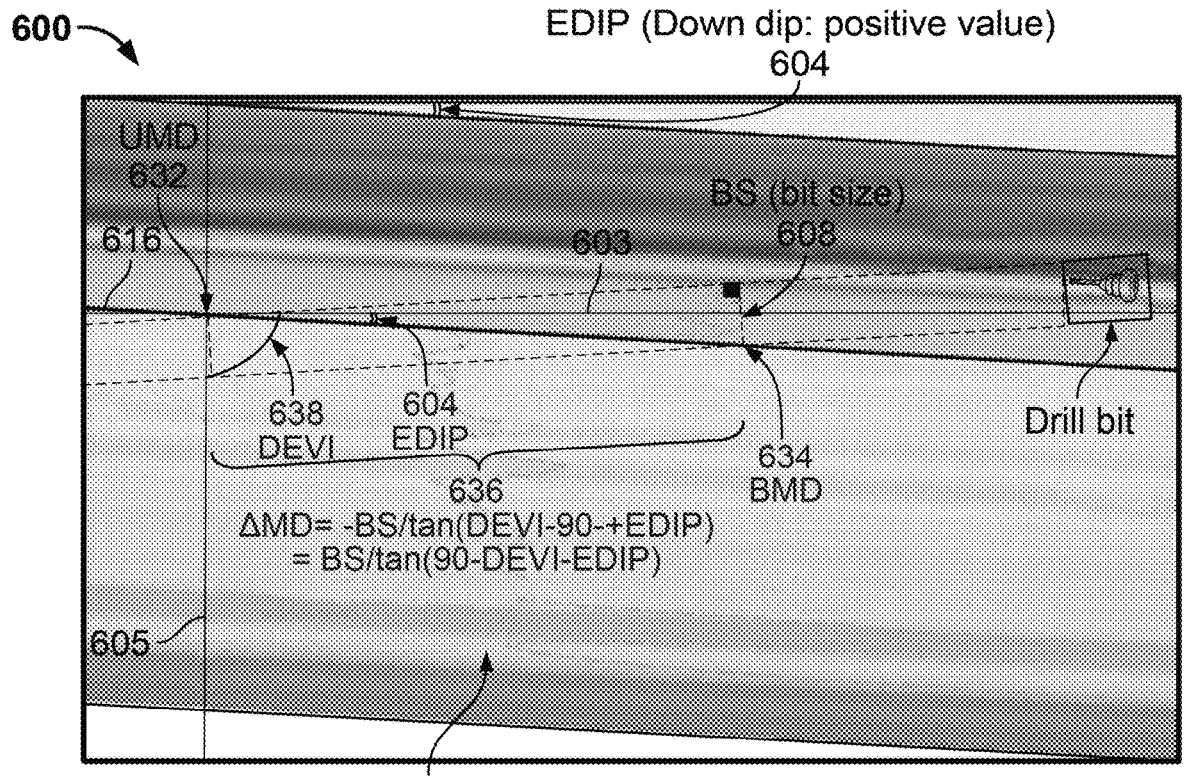
FIGS. 8A-8B illustrate cutting up in a down dip scenario and an up dip scenario.
Figure 8B:
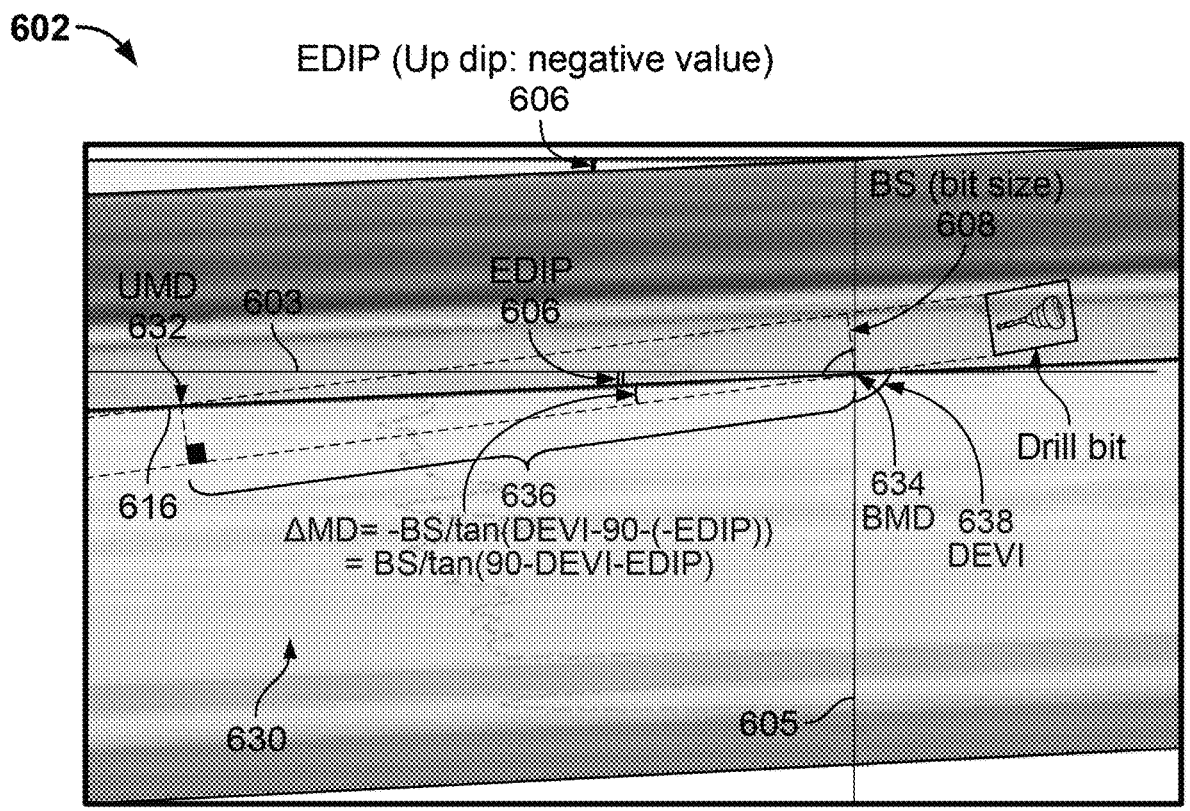

FIG. 5 shows a schematic of a vertical mother bore 500 and a sidetrack 502. Gamma ray logs 504 and 506 are displayed along the mother bore 500 and sidetrack 502, respectively. The data processing system identifies a formation surface in the mother bore 500 and the sidetrack 502 based on the gamma ray logs 504 and 506. The effective dip angle can be calculated from the right-angled triangles 508 and 510 formed connecting locations of identified surfaces between the mother bore 500 and sidetrack 502. The vertical depth difference "a" is the difference in the true depth (TD) or the subsea true vertical depth (TVDSS) between the identified surface in the mother bore 500 and the sidetrack 502. The horizontal distance "b" is the two-dimensional (2D) horizontal distance between the locations of the identified surface. The EDIP can be determined, for example, based on the tangent of the ratio of the distances (e.g., tan(EDIP)=a/b). The data processing system can continuously update the EDIP values based on newly acquired measurements of the sidetrack.

Turning back to FIG. 3, the data processing system generates a depth shift table based on the EDIP and a well deviation angle (DEVI) (step 306). The DEVI represents the angle of the wellbore with reference to the vertical. The DEVI can be obtained from a well survey. The depth shift table accounts for the measured depth at which the top and the bottom of the borehole encounter the same formation surface. Three example scenarios include cutting down the formation, cutting parallel to the formation and cutting up the formation depending on whether the well is drilled down dip or up dip. Measured depth difference ($\Delta$MD) represents a depth difference between the bottom measured depth (BMD) and the upper measured depth (UMD) of the bottom and top of the borehole, respectively. Coefficients of measured depth difference ($\Delta$MD) corresponding to an azimuthal location around the circumference of the borehole are based on the BMD and the UMD. Entries of the depth shift table can be generated, for example, by multiplying the $\Delta$MD coefficients by the value of $\Delta$MD at a given measured depth.

In some implementations, the data processing system generates a well survey dataset having a sampling rate on the order of feet (e.g., 10 feet or less, 5 feet or less, 3 feet or less) based on received well survey data having a lower sampling rate. For example, the data processing system can receive well survey data (e.g., DEVI or horizontal azimuthal angle of the well (HAZI)) with a sample occurring every 10 feet along the wellbore. The data processing system can generate a well survey dataset with a sample every 5 feet along the wellbore by, for example, interpolating the values of the received well survey data.

FIGS. 6A-8B schematically illustrate three example scenarios for drilling a borehole in a formation with down dip 600 and a formation with up dip 602. The formation with down dip 600 has a positive EDIP 604 as measured clockwise from the horizontal axis 603. The formation with up dip 602 has a negative EDIP 606 as measured counterclockwise from the horizontal. In case of cutting down the formation 610, the bottom side (BMD) 612 of the wellbore will touch the formation first and the upper side (UMD) 614 will touch the same formation layer 616 at a deeper measured depth in formations with down dip 600 and up dip 602. The depth difference $\Delta$MD 618 between the UMD 614 and BMD 612 can be expressed as follows, where BS is the drill bit size 608:

$$BMD = MD$$

$$\Delta MD = UMD - BMD$$

$$= BS/\tan(90 - DEVI - EDIP)$$

$$UMD = BMD + \Delta MD$$

$$= MD + \Delta MD$$

The well deviation (DEVI) 619 is less than 90 degrees as measured from the vertical axis 605 in this scenario.

In the scenario of the well path being drilled parallel to the formation 620, the UMD 622 and BMD 624 encounter parallel layers of the formation 616 and both are equivalent to the measured depth and the difference ΔMD 626 between UMD 622 and BMD 624 is equal to zero, for example: BMD=UMD=MD.

In the scenario of cutting up the formation 630, the upper side (UMD) 632 of the wellbore will touch the formation first and the bottom side (BMD) 634 will touch the same formation layer 616 later in both down dip 600 and up dip 602 formations. The depth difference ΔMD 636 between the UMD 632 and BMD 634 can be expressed as follows:

$$UMD = MD$$

$$\Delta MD = UMD - BMD$$

$$= -BS/\tan(DEVI - 90 + EDIP)$$

$$= BS/\tan(90 - DEVI - EDIP)$$

$$BMD = UMD - \Delta MD$$

$$= MD - \Delta MD$$

where the ΔMD will be a negative value since BMD 634 is greater than UMD 632. The DEVI 638 is greater than 90 degrees in this scenario.

Using this model, the value of ΔMD can diverge for values of the resultant angle (90-DEVI-EDIP) close to zero. The data processing system can multiply the determined ΔMD coefficients by the determined ΔMD for a given location in a borehole to determine an actual depth shift to apply during generation of synthetic borehole images. A ΔMD value can be determined for every location in the borehole.

Referring again to FIG. 3 and the method 300, the data processing system generates datasets based on the ROP data, resistivity data, and gamma ray data (step 308). The generated datasets have higher sampling rates than the logged data. For example, the logged data can have samples taken with a spatial frequency on the order of feet between samples. To generate high-resolution synthetic images, a spatial frequency on the order of tenths of inches can be needed (e.g., 1 inch or less, 0.1 inch or less). The data processing system generates the higher sampling rate data based on the logged data using, for example, polynomial interpolation, cubic spline interpolation, or other interpolation method.

The data processing system generates synthetic borehole images based on the generated datasets and the depth shift table (step 310). The data processing system can generate synthetic borehole images with multiple bin sectors (e.g., 16 or more bin sectors, 32 or more bin sectors) distributed azimuthally around the borehole circumference. Each bin sector image is associated with a depth shift coefficient (e.g., ΔMD coefficient). The data processing system can determine the depth shift for a bin sector image based on an entry of the depth shift table and the depth shift coefficient for each bin sector. For example, the data processing system can generate 32 bin sector images based on the depth differences between BMD and UMD for the same formation layer and the corresponding depth shift coefficient for the 32 azimuthal sector bins. Each bin sector image can have a fixed coefficient of ΔMD. In the case of a planar formation layer, the bin image depth shift for the same layer can be fit by a sinusoid.

For example, the data processing system can generate ROP synthetic borehole images based on the generated ROP dataset, the depth shift table, and the depth shift coefficient for each sector bin. For a synthetic image with 32 bin sectors, the synthetic image can have dimensions of the number of entries in the ROP dataset by 32. For each entry of the generated ROP dataset with an associated measured depth and value in the borehole, the data processing system determines corresponding pixels for each column in the synthetic image based on the depth shift associated with each bin sector at the measured depth. The data processing system fills the determined pixels with the value of the ROP entry.

The data processing system orients the synthetic borehole images with respect to a reference point of the borehole (step 312). The data processing system can orient the synthetic borehole images based on the azimuthal location of the bin sectors. The reference point can be the top of the borehole for horizontal wells. In some implementations, the reference point is an arbitrary azimuthal location around the circumference of the borehole.

Figure 9:
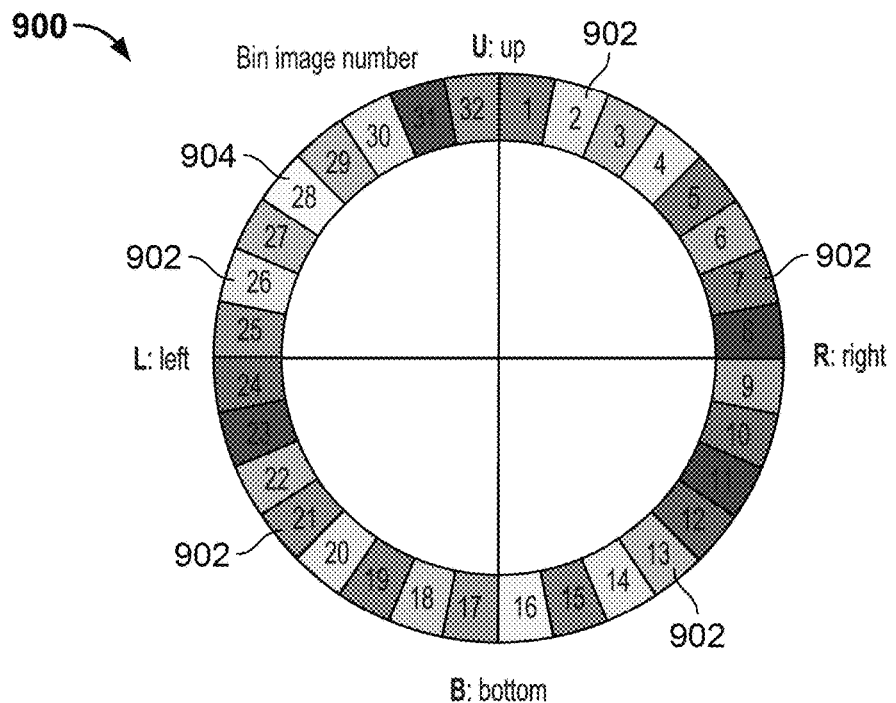
FIG. 9 is a schematic of bin sector positions for generating synthetic borehole images.

FIG. 9 illustrates a layout 900 of bin sectors 902 distributed around the azimuth of the borehole 904. The layout 900 includes 32 bin sectors numbered from 1 to 32 proceeding in a clockwise direction from the top of the borehole. Bin sectors 1 and 32 are at the top of the borehole, and bin sectors 16 and 17 are at the bottom of the borehole.

Figure 10:
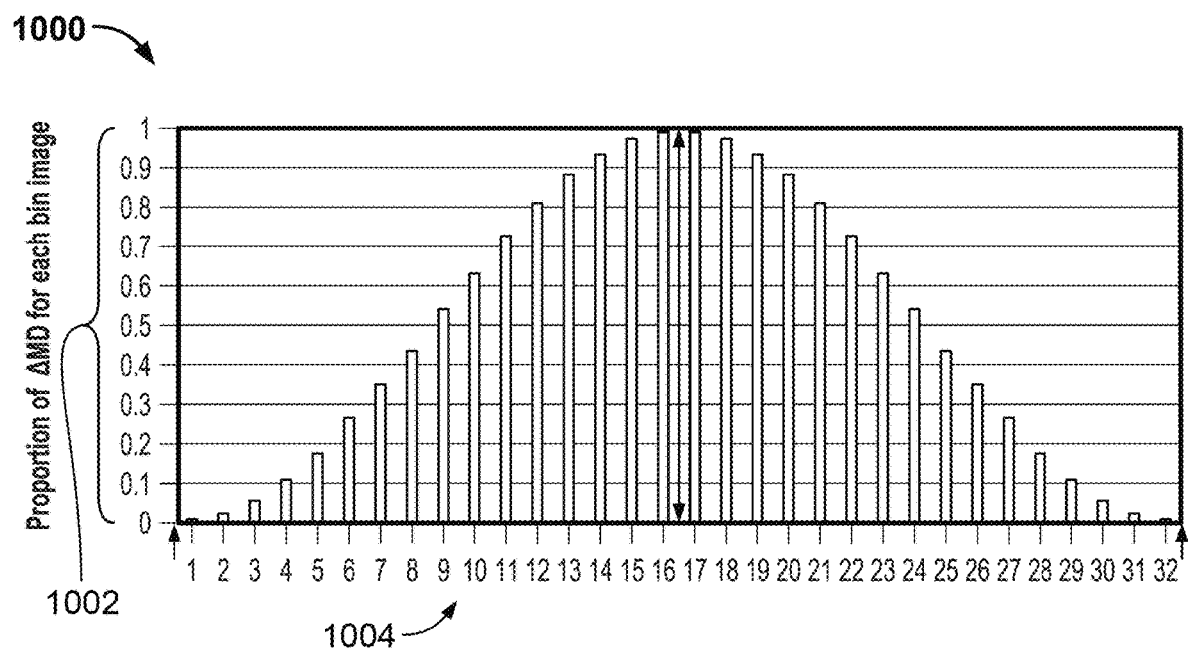
FIG. 10 is a plot of difference in measured depth coefficient for each of the bins illustrated in FIG. 9.

FIG. 10 is a plot 1000 illustrating the ΔMD coefficient 1002 for bin sectors 1004 depicted in FIG. 9 based on a sinusoid. The ΔMD coefficients 1002 correspond with a cutting down the formation scenario where the bottom of the borehole encounters a formation layer first and the top of the borehole encounters the layer at a later depth. The data processing system will shift the values for the bin sector's image accordingly, for example, the depth of the bottom of the borehole (e.g., bin sectors 16 and 17) will be the measured depth plus ΔMD*(1−ΔBD16) or the measured depth plus ΔMD*(1−ΔBD17), where ΔBD16 and ΔBD17 are the ΔMD coefficients corresponding to bin sectors 16 and 17, respectively. Bin sectors at the top of the borehole (e.g., bin sectors 1 and 32) will shift more, and the value will be the measured depth plus ΔMD*(1−ΔBD1) or the measured depth plus ΔMD*(1−ΔBD32). Table 1 shows the coefficient values corresponding to the bin sectors in FIG. 10.

TABLE 1

Coefficient value of each sector image for a given ΔMD value.

| Bin image number | Coefficient | ΔMD |
| --- | --- | --- |
| ΔBD1 | 0.002408 | ΔMD |
| ΔBD2 | 0.02153 | ΔMD |
| ΔBD3 | 0.059039 | ΔMD |
| ΔBD4 | 0.113495 | ΔMD |

TABLE 1-continued

Coefficient value of each sector image for a given ΔMD value.

| Bin image number | Coefficient | ΔMD |
|---|---|---|
| ΔBD5 | 0.182803 | ΔMD |
| ΔBD6 | 0.264302 | ΔMD |
| ΔBD7 | 0.354858 | ΔMD |
| ΔBD8 | 0.450991 | ΔMD |
| ΔBD9 | 0.549009 | ΔMD |
| ΔBD10 | 0.645142 | ΔMD |
| ΔBD11 | 0.735698 | ΔMD |
| ΔBD12 | 0.817197 | ΔMD |
| ΔBD13 | 0.886505 | ΔMD |
| ΔBD14 | 0.940961 | ΔMD |
| ΔBD15 | 0.97847 | ΔMD |
| ΔBD16 | 0.997592 | ΔMD |
| ΔBD17 | 0.997592 | ΔMD |
| ΔBD18 | 0.97847 | ΔMD |
| ΔBD19 | 0.940961 | ΔMD |
| ΔBD20 | 0.886505 | ΔMD |
| ΔBD21 | 0.817197 | ΔMD |
| ΔBD22 | 0.735698 | ΔMD |
| ΔBD23 | 0.645142 | ΔMD |
| ΔBD24 | 0.549009 | ΔMD |
| ΔBD25 | 0.450991 | ΔMD |
| ΔBD26 | 0.354858 | ΔMD |
| ΔBD27 | 0.264302 | ΔMD |
| ΔBD28 | 0.182803 | ΔMD |
| ΔBD29 | 0.113495 | ΔMD |
| ΔBD30 | 0.059039 | ΔMD |
| ΔBD31 | 0.02153 | ΔMD |
| ΔBD32 | 0.002408 | ΔMD |

Figure 11:
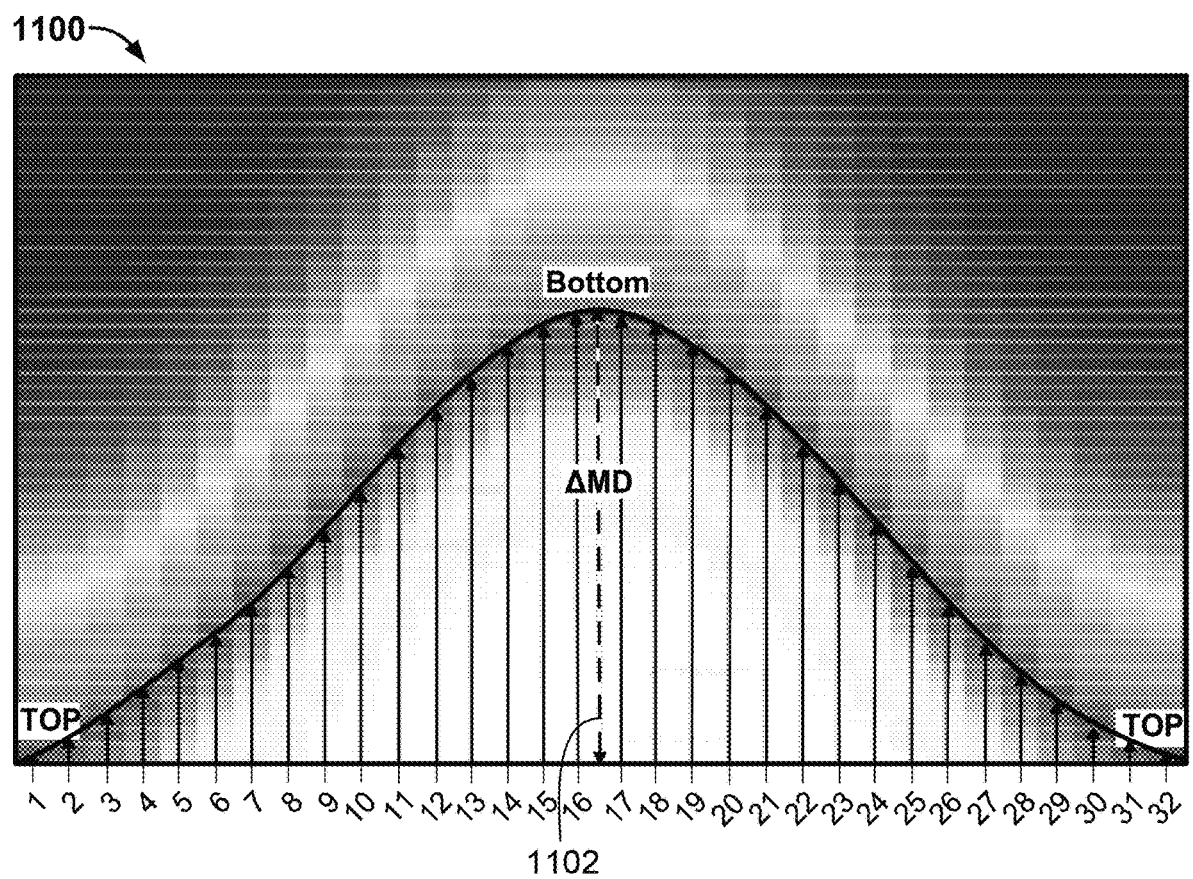
FIG. 11 is a synthetic borehole image generated based on the difference in measured depth coefficient of FIG. 10.

FIG. 11 is an example synthetic image 1100 generated with a sinusoid. In the image 1100, the borehole is being drilled in a cutting down scenario and shows a characteristic "sad face." In this example, the vertical height 1102 of the peak corresponds with ΔMD. The values at the top of the borehole (e.g., 1 and 32) are shifted to a deeper depth (e.g., measured depth plus ΔMD*(1−ΔBD1) or measured depth plus ΔMD*(1−ΔBD32)) relative to the values at the bottom of the borehole (e.g., 16 and 17) (e.g., measured depth plus ΔMD*(1−ΔBD16) or measured depth plus ΔMD*(1−ΔBD17)).

Figure 12:
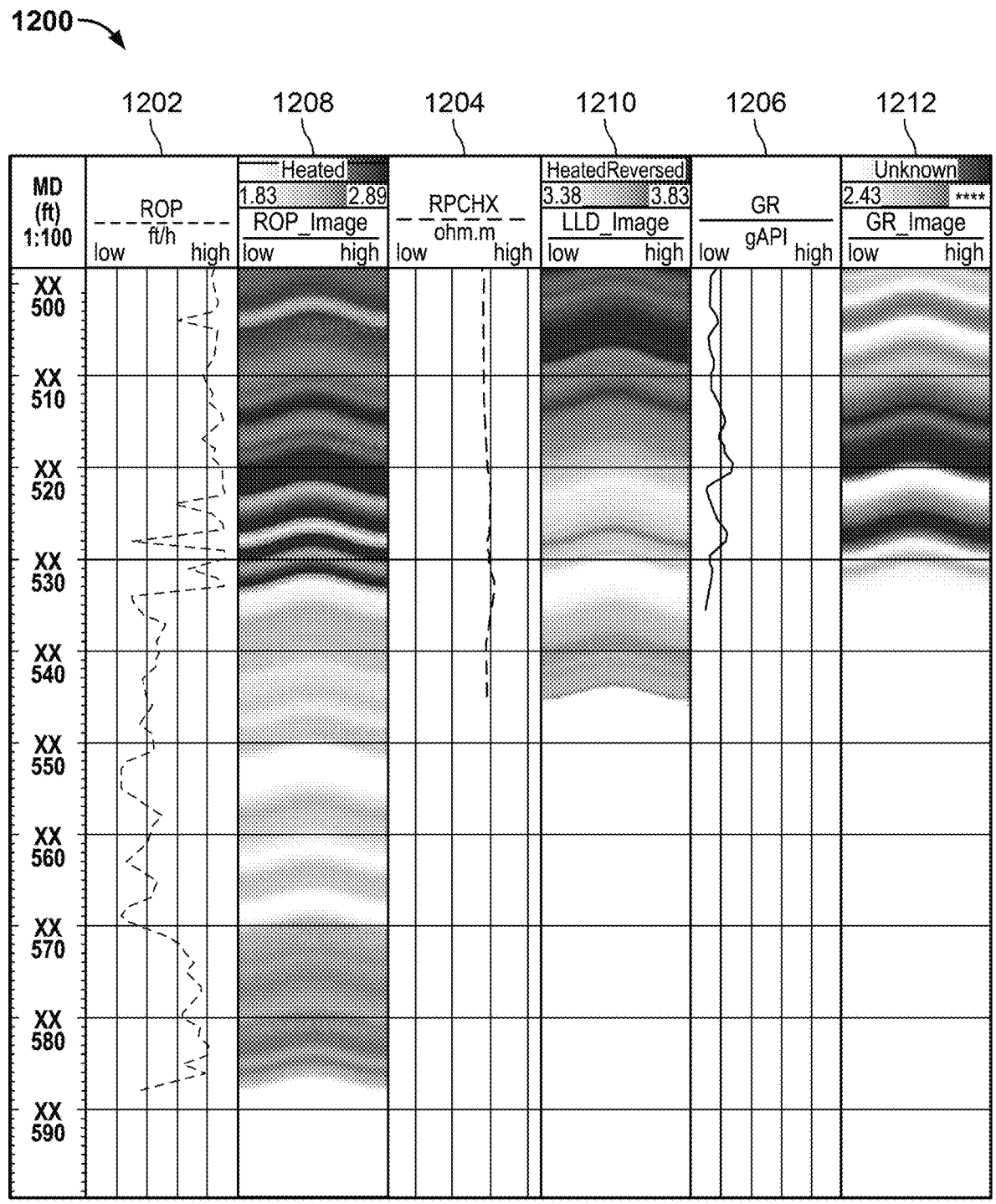
FIG. 12 is a composite plot showing LWD logs and synthetic borehole image logs generated by an implementation of the method of FIG. 3.

FIG. 12 is an example composite plot 1200 including LWD measurements of ROP 1202, resistivity 1204, and gamma ray 1206. Synthetic borehole images 1208-1212 were generated based on each LWD log using an implementation of the method 300. Synthetic borehole images were generated to the depth of each log. For example, the ROP synthetic borehole images 1208 extend to the same depth as the ROP log 1202.

Synthetic images generated by the method 300 can be utilized for better well placement for wells using UBCTD without borehole image logging tools for hole sizes 3⅝" in diameter. The at-bit ROP can provide early indications of reservoir quality although ROP readings can be affected by many factors. Higher ROP can indicate better reservoir quality and higher porosity. Reservoir quality can be better assessed when using ROP with a combination of gamma ray and resistivity logs. Higher ROP and lower gamma ray readings are likely to indicate more porous sands. Higher ROP and lower resistivity are likely to indicate more porous carbonate reservoirs.

Figure 13:
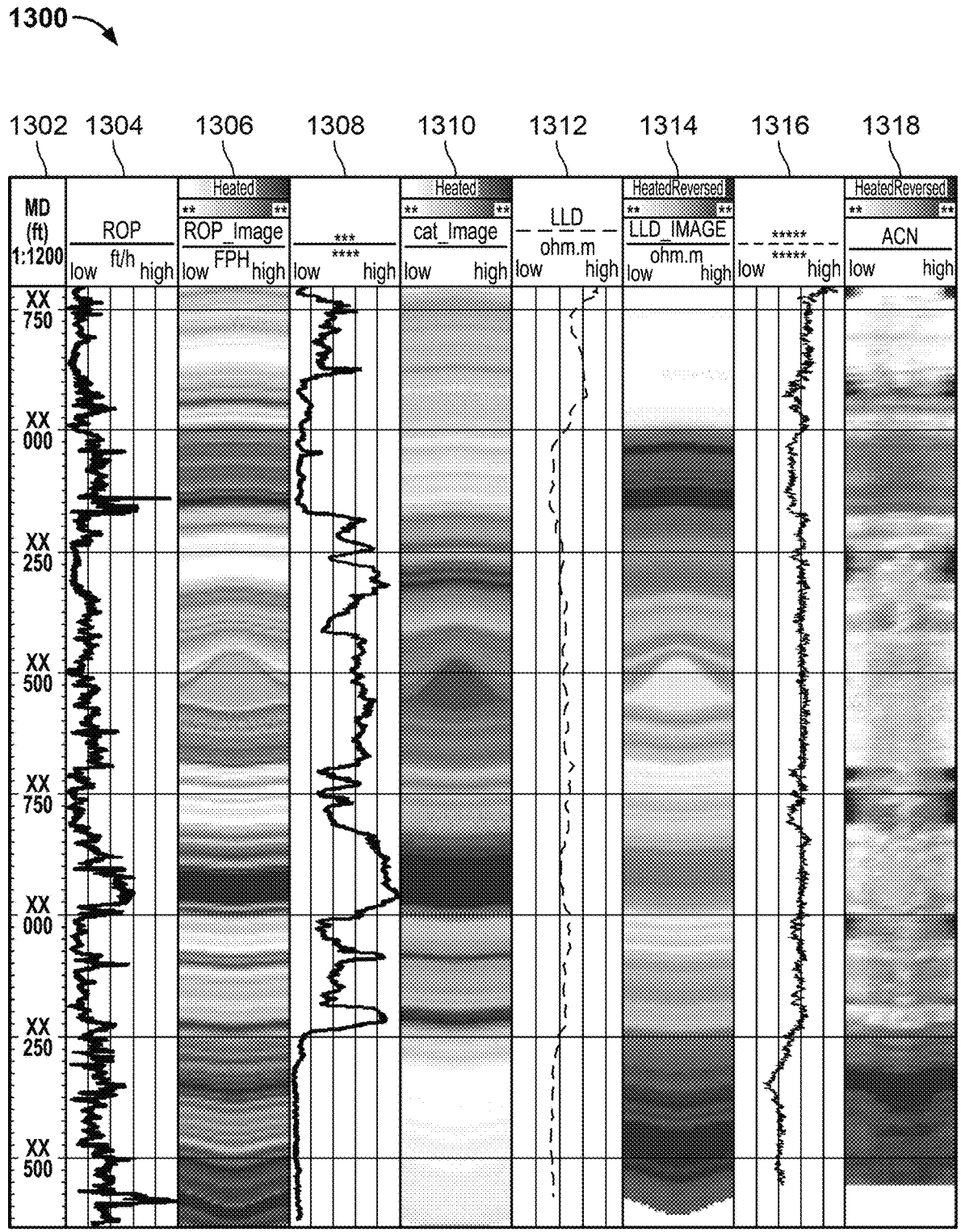
FIG. 13 is a composite plot of synthetic images from an example implementation of the method of FIG. 3 compared with a measured density borehole images in the same wellbore.

FIG. 13 shows a composite plot 1300 with synthetic images generated using the method 300 for a 5⅞" in diameter borehole. Density images for the same borehole were also obtained during drilling for reference. Track 1 is the depth index 1302. Track 2 is the ROP log 1304. Track 3 is the at-bit ROP synthetic image 1306. Track 4 is the near bit gamma ray log 1308. Track 5 is the near bit gamma ray synthetic image log 1310. Track 6 is the near bit resistivity log 1312. Track 7 is the near bit resistivity synthetic image log 1314. Track 8 is the density log 1316. Track 9 is the measured density image log 1318. The length of the tracks indicates the distance of the measurement from the drill bit due to the tool configuration.

The generated at-bit ROP images 1306, near-bit gamma ray images 1310, and resistivity images 1314 from the same wellbore show similar stratigraphic features as the measured density images 1318. The generated synthetic images 1306, 1310, and 1314 have better image resolution compared with the measured density image 1318. The synthetic images 1306, 1310, and 1314 provide around 100 ft of additional image ahead of density image 1318.

The method 300 is not limited to application to slimholes and extra slimholes. The method 300 can be applied to larger diameter wellbores by taking into account the different bit size during the ΔMD computation process.

The data processing system can generate visual representations of the borehole path against formations based on the LWD data and the generated synthetic borehole images. The data processing system can display the visual representations on a display device providing operators a visual cue on the placement of the wellbore in the subsurface formation. For example, a "sad face" or concave downward pattern in the synthetic borehole images indicates that the wellbore is cutting down the formation. The bottom of the borehole encounters a formation layer before the top of the borehole encounters the same formation layer. A "happy face" or concave upward pattern in the synthetic borehole images indicates that the wellbore is cutting up the formation. The top of the borehole encounters a formation layer before the bottom of the borehole encounters the same layer.

In some implementations, the data processing system generates control commands to control drilling equipment based on the formation cutting direction identified in the oriented synthetic borehole image logs. For example, the data processing system can determine that the well bore is cutting up a formation based on the synthetic borehole image. The data processing system can generate commands to increase or decrease the well deviation angle to, for example, drill the well more parallel to the formation to place the well in a target zone of the formation.

Figure 14:
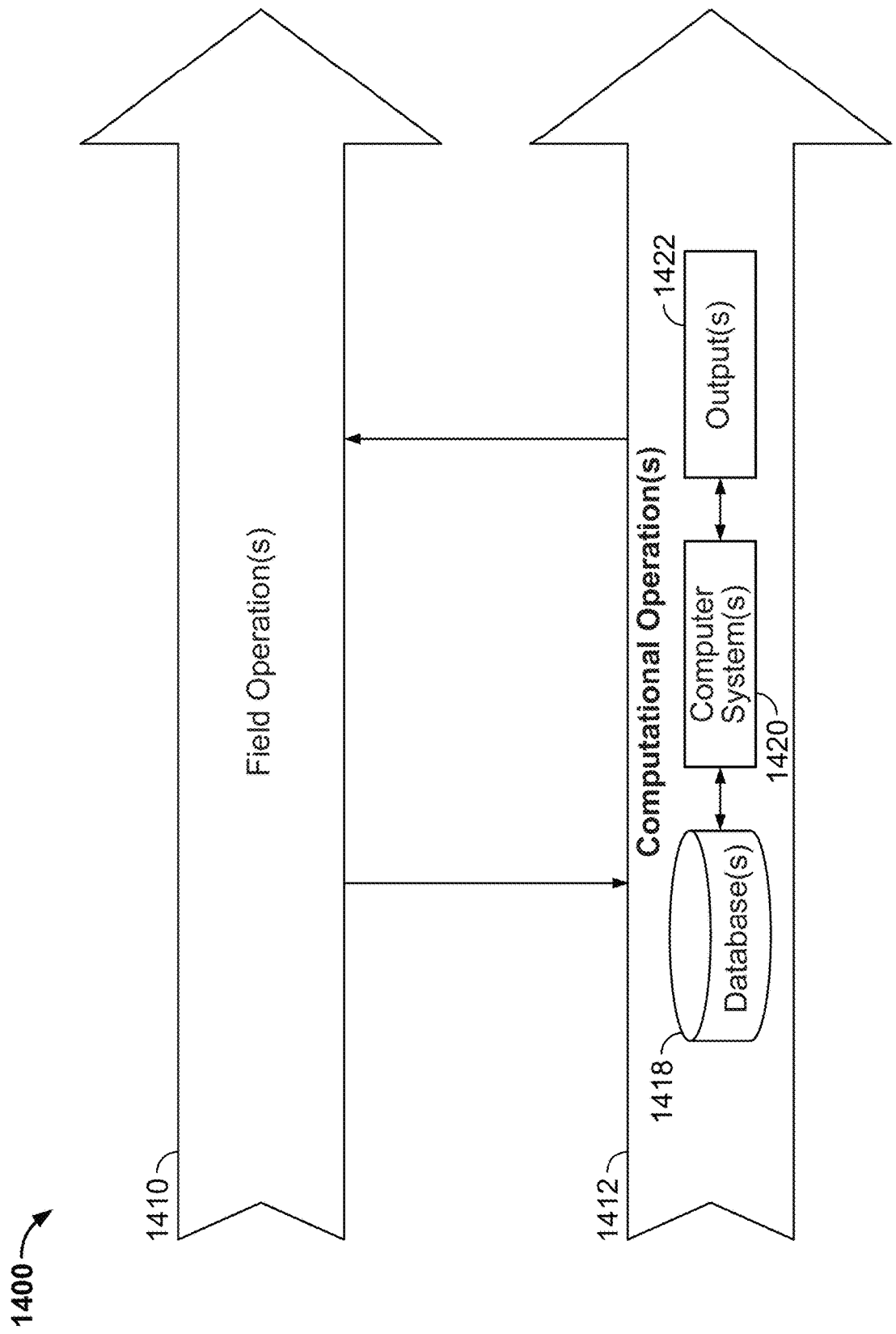
FIG. 14 illustrates hydrocarbon production operations that include field operations and computational operations.

FIG. 14 illustrates hydrocarbon production operations 1400 that include both one or more field operations 1410 and one or more computational operations 1412, which exchange information and control exploration for the production of hydrocarbons. In some implementations, outputs of techniques of the present disclosure (e.g., the method 300) can be performed before, during, or in combination with the hydrocarbon production operations 1400, specifically, for example, either as field operations 1410 or computational operations 1412, or both. For example, the method 300 collects data during field operations, processes the data in computational operations, and can determine locations to perform additional field operations.

Examples of field operations 1410 include forming/drilling a wellbore, hydraulic fracturing, producing through the wellbore, injecting fluids (such as water) through the wellbore, to name a few. In some implementations, methods of the present disclosure can trigger or control the field operations 1410. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1410 and responsively triggering the field operations 1410 including, for example, generating plans and signals that provide feedback to and control physical components of the field operations 1410. Alternatively, or in addition, the field operations 1410 can trigger the methods of the present disclosure. For example, implementing physical components (including, for example, hardware, such as sensors) deployed in the field operations 1410 can generate plans and signals that can be provided as input or feedback (or both) to the methods of the present disclosure.

Examples of computational operations 1412 include one or more computer systems 1420 that include one or more processors and computer-readable media (e.g., non-transitory computer-readable media) operatively coupled to the one or more processors to execute computer operations to perform the methods of the present disclosure. The computational operations 1412 can be implemented using one or more databases 1418, which store data received from the field operations 1410 and/or generated internally within the computational operations 1412 (e.g., by implementing the methods of the present disclosure) or both. For example, the one or more computer systems 1420 process inputs from the field operations 1410 to assess conditions in the physical world, the outputs of which are stored in the databases 1418. For example, seismic sensors of the field operations 1410 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1412 where they are stored in the databases 1418 and analyzed by the one or more computer systems 1420.

In some implementations, one or more outputs 1422 generated by the one or more computer systems 1420 can be provided as feedback/input to the field operations 1410 (either as direct input or stored in the databases 1418). The field operations 1410 can use the feedback/input to control physical components used to perform the field operations 1410 in the real world.

For example, the computational operations 1412 can process the seismic data to generate three-dimensional (3D) maps of the subsurface formation. The computational operations 1412 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1412 to process new information about the formation and control the drilling to adjust to the observed conditions in real-time.

The one or more computer systems 1420 can update the 3D maps of the subsurface formation as information from one exploration well is received and the computational operations 1412 can adjust the location of the next exploration well based on the updated 3D maps. Similarly, the data received from production operations can be used by the computational operations 1412 to control components of the production operations. For example, production well and pipeline data can be analyzed to predict slugging in pipelines leading to a refinery and the computational operations 1412 can control machine operated valves upstream of the refinery to reduce the likelihood of plant disruptions that run the risk of taking the plant offline.

In some implementations of the computational operations 1412, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart or are located in different countries or other jurisdictions.

Figure 15:
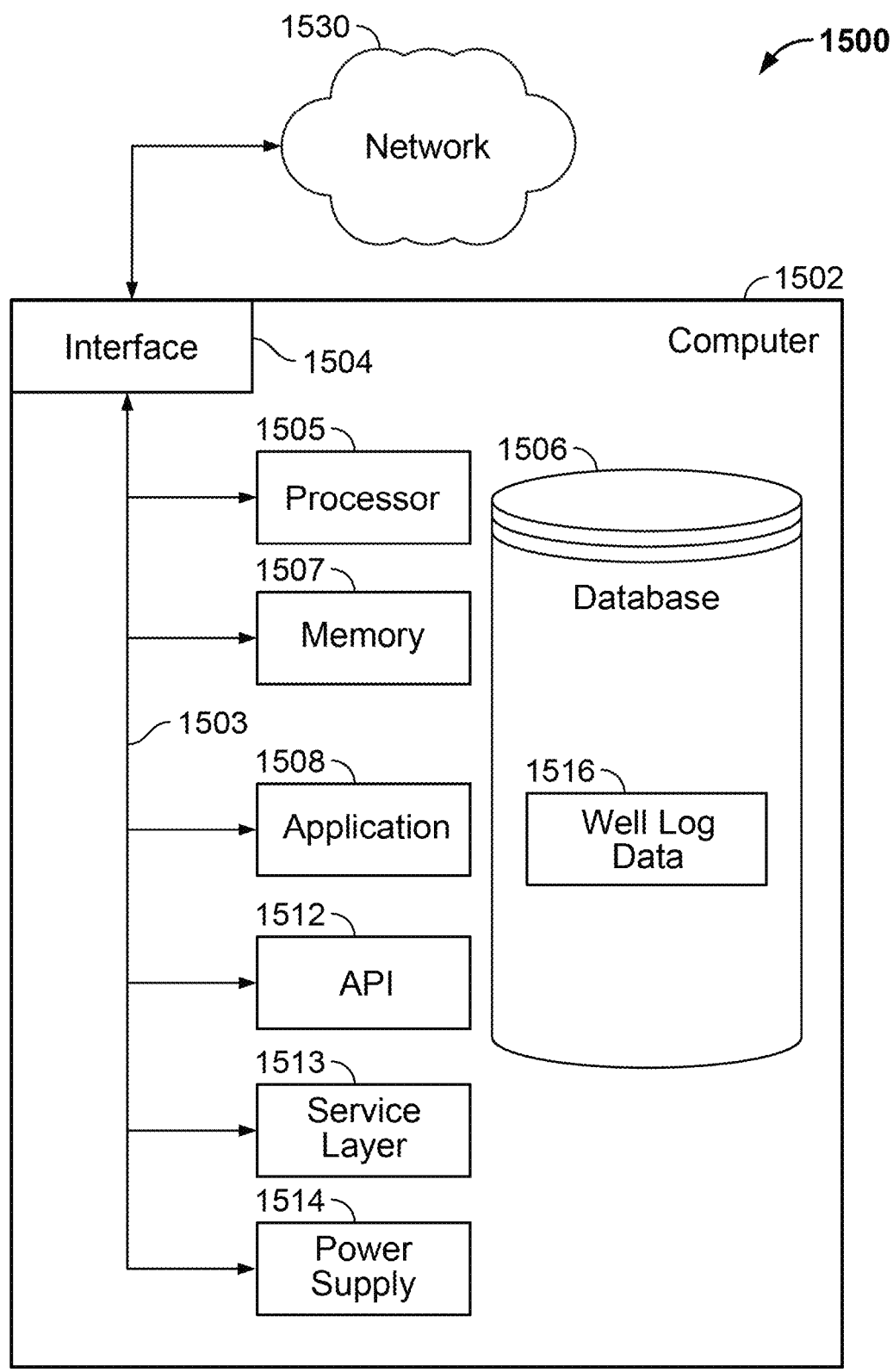
FIG. 15 is a block diagram illustrating an example computer system used to provide computational functionalities associated with described algorithms, methods, functions, processes, flows, and procedures according to some implementations of the present disclosure.

FIG. 15 is a block diagram of an example computer system 1500 used to provide computational functionalities associated with described algorithms, methods, functions, processes, flows, and procedures described in the present disclosure, according to some implementations of the present disclosure. The illustrated computer 1502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1502 can include input devices such as keypads, keyboards, and touch screens that can accept user information. Also, the computer 1502 can include output devices that can convey information associated with the operation of the computer 1502. The information can include digital data, visual data, audio information, or a combination of information. The information can be presented in a graphical user interface (UI) (or GUI).

The computer 1502 can serve in a role as a client, a network component, a server, a database, a persistency, or components of a computer system for performing the subject matter described in the present disclosure. The illustrated computer 1502 is communicably coupled with a network 1530. In some implementations, one or more components of the computer 1502 can be configured to operate within different environments, including cloud-computing-based environments, local environments, global environments, and combinations of environments.

At a high level, the computer 1502 is an electronic computing device operable to receive, transmit, process, store, and manage data and information associated with the described subject matter. According to some implementations, the computer 1502 can also include, or be communicably coupled with, an application server, an email server, a web server, a caching server, a streaming data server, or a combination of servers.

The computer 1502 can receive requests over network 1530 from a client application (for example, executing on another computer 1502). The computer 1502 can respond to the received requests by processing the received requests using software applications. Requests can also be sent to the computer 1502 from internal users (for example, from a command console), external (or third) parties, automated applications, entities, individuals, systems, and computers.

Each of the components of the computer 1502 can communicate using a system bus 1503. In some implementations, any, or all of the components of the computer 1502, including hardware or software components, can interface with each other or the interface 1504 (or a combination of both), over the system bus 1503. Interfaces can use an application programming interface (API) 1512, a service layer 1513, or a combination of the API 1512 and service layer 1513. The API 1512 can include specifications for routines, data structures, and object classes. The API 1512 can be either computer-language independent or dependent. The API 1512 can refer to a complete interface, a single function, or a set of APIs.

The service layer 1513 can provide software services to the computer 1502 and other components (whether illustrated or not) that are communicably coupled to the computer 1502. The functionality of the computer 1502 can be accessible for all service consumers using this service layer. Software services, such as those provided by the service layer 1513, can provide reusable, defined functionalities through a defined interface. For example, the interface can be software written in JAVA, C++, or a language providing data in extensible markup language (XML) format. While illustrated as an integrated component of the computer 1502, in alternative implementations, the API 1512 or the service layer 1513 can be stand-alone components in relation to other components of the computer 1502 and other components communicably coupled to the computer 1502. Moreover, any or all parts of the API 1512 or the service layer 1513 can be implemented as child or sub-modules of another software module, enterprise application, or hardware module without departing from the scope of the present disclosure.

The computer 1502 includes an interface 1504. Although illustrated as a single interface 1504 in FIG. 15, two or more interfaces 1504 can be used according to particular needs, desires, or particular implementations of the computer 1502 and the described functionality. The interface 1504 can be used by the computer 1502 for communicating with other systems that are connected to the network 1530 (whether illustrated or not) in a distributed environment. Generally, the interface 1504 can include, or be implemented using, logic encoded in software or hardware (or a combination of software and hardware) operable to communicate with the network 1530. More specifically, the interface 1504 can include software supporting one or more communication protocols associated with communications. As such, the network 1530 or the interface's hardware can be operable to communicate physical signals within and outside of the illustrated computer 1502.

The computer 1502 includes a processor 1505. Although illustrated as a single processor 1505 in FIG. 15, two or more processors 1505 can be used according to particular needs, desires, or particular implementations of the computer 1502 and the described functionality. Generally, the processor 1505 can execute instructions and can manipulate data to perform the operations of the computer 1502, including operations using algorithms, methods, functions, processes, flows, and procedures as described in the present disclosure.

The computer 1502 also includes a database 1506 that can hold data for the computer 1502 and other components connected to the network 1530 (whether illustrated or not). For example, database 1506 can be an in-memory, conventional, or a database storing data consistent with the present disclosure. In some implementations, database 1506 can be a combination of two or more different database types (for example, hybrid in-memory and conventional databases) according to particular needs, desires, or particular implementations of the computer 1502 and the described functionality. Although illustrated as a single database 1506 in FIG. 15, two or more databases (of the same, different, or combination of types) can be used according to particular needs, desires, or particular implementations of the computer 1502 and the described functionality. While database 1506 is illustrated as an internal component of the computer 1502, in alternative implementations, database 1506 can be external to the computer 1502.

The computer 1502 also includes a memory 1507 that can hold data for the computer 1502 or a combination of components connected to the network 1530 (whether illustrated or not). Memory 1507 can store any data consistent with the present disclosure. In some implementations, memory 1507 can be a combination of two or more different types of memory (for example, a combination of semiconductor and magnetic storage) according to particular needs, desires, or particular implementations of the computer 1502 and the described functionality. Although illustrated as a single memory 1507 in FIG. 15, two or more memories 1507 (of the same, different, or combination of types) can be used according to particular needs, desires, or particular implementations of the computer 1502 and the described functionality. While memory 1507 is illustrated as an internal component of the computer 1502, in alternative implementations, memory 1507 can be external to the computer 1502.

The application 1508 can be an algorithmic software engine providing functionality according to particular needs, desires, or particular implementations of the computer 1502 and the described functionality. For example, application 1508 can serve as one or more components, modules, or applications. Further, although illustrated as a single application 1508, the application 1508 can be implemented as multiple applications 1508 on the computer 1502. In addition, although illustrated as internal to the computer 1502, in alternative implementations, the application 1508 can be external to the computer 1502.

The computer 1502 can also include a power supply 1514. The power supply 1514 can include a rechargeable or non-rechargeable battery that can be configured to be either user-or non-user-replaceable. In some implementations, the power supply 1514 can include power-conversion and management circuits, including recharging, standby, and power management functionalities. In some implementations, the power-supply 1514 can include a power plug to allow the computer 1502 to be plugged into a wall socket or a power source to, for example, power the computer 1502 or recharge a rechargeable battery.

There can be any number of computers 1502 associated with, or external to, a computer system containing computer 1502, with each computer 1502 communicating over network 1530. Further, the terms "client," "user," and other appropriate terminology can be used interchangeably, as appropriate, without departing from the scope of the present disclosure. Moreover, the present disclosure contemplates that many users can use one computer 1502 and one user can use multiple computers 1502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware-or software-based (or a combination of both hardware-and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for generating synthetic borehole image logs, the method comprising:
    logging rate of penetration (ROP) data, resistivity data, and gamma ray data while drilling a borehole in a subsurface formation to generate logged data;
    determining an effective dip angle of the subsurface formation along the borehole;
    generating a depth shift table based on the effective dip angle and a well deviation angle, the well deviation angle being between the borehole and a vertical reference;
    generating datasets based on the ROP data, resistivity data, and gamma ray data, the generated datasets having higher sampling rates than the logged data;
    generating synthetic borehole images based on the generated datasets and the depth shift table; and
    orienting the synthetic borehole images with respect to a reference point of the borehole,
    wherein determining an effective dip of the subsurface formation comprises:
    determining a vertical distance between a first true depth location of a surface in the borehole and a second true depth location of the surface in a mother bore associated with the borehole;
    determining a horizontal distance between the first and second true depth locations; and
    determining the effective dip angle based on the vertical distance and the horizontal distance.

2. The method of claim 1, further comprising: drilling a well along a well path based on a formation cutting direction identified in the oriented synthetic borehole images.

3. The method of claim 1, further comprising: generating a visual representation of the borehole based on at least one of the ROP data, resistivity data, gamma ray data, and synthetic borehole images.

4. The method of claim 1, wherein generating the synthetic borehole images comprises generating one or more of synthetic at bit ROP borehole images, synthetic near bit gamma ray borehole images, and synthetic near bit resistivity borehole images.

5. The method of claim 1, wherein determining effective dip of the formation comprises measuring a dip of the formation along the well path based on a structure map of the subsurface formation.

6. The method of claim 1, wherein generating the synthetic borehole images comprises generating a plurality of bin sector images, each bin sector image having a fixed coefficient of measured depth difference.

7. The method of claim 6, wherein the fixed coefficient of measured depth difference is based on a sinusoid and an azimuthal location of the bin sector image.

8. The method of claim 1, wherein the generated datasets have a sampling rate of at least one sample per 0.1 inch.

9. A system for generating borehole image logs, the system comprising:
    at least one processor; and
    a memory storing instructions that, when executed by the at least one processor, cause the at least one processor to perform operations comprising:
    logging rate of penetration (ROP) data, resistivity data, and gamma ray data while drilling a borehole in a subsurface formation to generate logged data;
    determining an effective dip angle of the subsurface formation along the borehole;
    generating a depth shift table based on the effective dip angle and a well deviation angle, the well deviation angle being between the borehole and a vertical reference;
    generating datasets based on the ROP data, resistivity data, and gamma ray data, the generated datasets having higher sampling rates than the logged data;
    generating synthetic borehole images based on the generated datasets and the depth shift table; and
    orienting the synthetic borehole images with respect to a reference point of the borehole,
    wherein determining an effective dip of the subsurface formation comprises:
    determining a vertical distance between a first true depth location of a surface in the borehole and a second true depth location of the surface in a mother bore associated with the borehole;
    determining a horizontal distance between the first and second true depth locations; and
    determining the effective dip angle based on the vertical distance and the horizontal distance.

10. The system of claim 9, wherein the instructions further comprise:
    drilling a well along a well path based on a formation cutting direction identified in the oriented synthetic borehole images.

11. The system of claim 9, wherein the instructions further comprise:
    generating a visual representation of the borehole based on at least one of the ROP data, resistivity data, gamma ray data, and synthetic borehole images.

12. The system of claim 9, wherein generating the synthetic borehole images comprises generating one or more of synthetic at bit ROP borehole images, synthetic near bit gamma ray borehole images, and synthetic near bit resistivity borehole images.

13. The system of claim 9, wherein determining effective dip of the formation comprises measuring a dip of the formation along the well path based on a structure map of the subsurface formation.

14. The system of claim 9, wherein generating the synthetic borehole images comprises generating a plurality of bin sector images, each bin sector image having a fixed coefficient of measured depth difference, the fixed coefficient of measured depth difference being based on a sinusoid and an azimuthal location of the bin sector image.

15. One or more non-transitory machine-readable storage devices storing instructions for generating synthetic borehole image logs, the instructions being executable by one or more processors, to cause performance of operations comprising:

logging rate of penetration (ROP) data, resistivity data, and gamma ray data while drilling a borehole in a subsurface formation to generate logged data;

determining an effective dip angle of the subsurface formation along the borehole;

generating a depth shift table based on the effective dip angle and a well deviation angle, the well deviation angle being between the borehole and a vertical reference;

generating datasets based on the ROP data, resistivity data, and gamma ray data, the generated datasets having higher sampling rates than the logged data;

generating synthetic borehole images based on the generated datasets and the depth shift table; and orienting the synthetic borehole images with respect to a reference point of the borehole, wherein determining an effective dip of the subsurface formation comprises:

determining a vertical distance between a first true depth location of a surface in the borehole and a second true depth location of the surface in a mother bore associated with the borehole;

determining a horizontal distance between the first and second true depth locations; and determining the effective dip angle based on the vertical distance and the horizontal distance.

16. The non-transitory machine-readable storage devices of claim 15, wherein generating the synthetic borehole images comprises generating one or more of synthetic at bit ROP borehole images, synthetic near bit gamma ray borehole images, and synthetic near bit resistivity borehole images.

17. The non-transitory machine-readable storage devices of claim 15, wherein generating the synthetic borehole images comprises generating a plurality of bin sector images, each bin sector image having a fixed coefficient of measured depth difference, the fixed coefficient of measured depth difference being based on a sinusoid and an azimuthal location of the bin sector image.

\* \* \* \* \*